(12) United States Patent
Michaels

(10) Patent No.: US 10,447,339 B2
(45) Date of Patent: Oct. 15, 2019

(54) COMMUNICATION SYSTEM EMPLOYING CHAOTIC SEQUENCE BASED FREQUENCY SHIFT KEYING SPREADING SIGNALS

(71) Applicant: Chaos Prime, Inc., Sunnyvale, CA (US)

(72) Inventor: Alan Michaels, Blacksburg, VA (US)

(73) Assignee: Chaos Prime Inc., Fremont, CA (US)

( * ) Notice: Subject to any disclaimer, the term of this patent is extended or adjusted under 35 U.S.C. 154(b) by 0 days.

(21) Appl. No.: 15/961,731

(22) Filed: Apr. 24, 2018

(65) Prior Publication Data

US 2018/0309477 A1    Oct. 25, 2018

Related U.S. Application Data

(60) Provisional application No. 62/489,041, filed on Apr. 24, 2017.

(51) Int. Cl.
*H04B 1/707* (2011.01)
*H04B 1/7075* (2011.01)
(Continued)

(52) U.S. Cl.
CPC ......... *H04B 1/70754* (2013.01); *H04B 1/707* (2013.01); *H04L 27/122* (2013.01);
(Continued)

(58) Field of Classification Search
CPC .... H04J 13/0018; H04L 27/001; H04L 9/001; H04L 9/0662; H04L 27/2278;
(Continued)

(56) References Cited

U.S. PATENT DOCUMENTS 5,878,076 A * 3/1999 Siedenburg ........ H04B 1/70753
   375/141
7,433,910 B2  10/2008 Rawlins et al.
   (Continued)

OTHER PUBLICATIONS

B. G. Agee, R. J. Kleinman and J. H. Reed, "Soft synchronization of direct sequence spread-spectrum signals," in IEEE Transactions on Communications, vol. 44, No. 11, pp. 1527-1536, Nov. 1996.
(Continued)

*Primary Examiner* — Rahel Guarino
(74) *Attorney, Agent, or Firm* — Trellis IP Law Group, PC

(57) ABSTRACT

A candidate arbitrary-phase spread spectrum modulation technique that offers similar performance to spread continuous phase modulation (CPM) waveforms and additional capabilities for programming a chosen frequency domain spectra into the resulting spread spectrum signal. The proposed chaotic-FSK waveform is derived from high-order sequence-based spread spectrum signals, with multi-bit resolution chaos-based sequences defining incremental phase words, enabling real-time efficient generation of practically non-repeating waveforms. A result of the C-FSK formulation is a parameterized hybrid modulation capable of acting like a traditional sequence-based spread spectrum signal or a traditional frequency shift keying signal depending on chosen parameters. As such, adaptation in this modulation may be easily implemented as a time-varying evolution, increasing the security of the waveform while retaining many efficiently implementable receiver design characteristics of traditional PSK modulations.

30 Claims, 7 Drawing Sheets

(51) Int. Cl.
*H04L 27/20* (2006.01)
*H04L 27/12* (2006.01)

(52) U.S. Cl.
CPC ...... *H04L 27/2028* (2013.01); *H04L 27/2035* (2013.01); *H04L 27/2092* (2013.01); *H04B 2001/70724* (2013.01); *H04B 2201/7073* (2013.01)

(58) Field of Classification Search
CPC .............. H04L 27/122; H04L 27/2028; H04L 27/2035; H04L 27/2092; H04B 1/707; H04B 1/0475; H04B 1/69; H04B 1/70754; H04B 2001/70724; H04B 2201/7073
See application file for complete search history.

(56) References Cited

U.S. PATENT DOCUMENTS

| | | | |
|---|---|---|---|
| 8,064,552 B2 | 11/2011 | Chester et al. | |
| 8,644,362 B1* | 2/2014 | Lauer | H04J 13/0018 375/141 |
| 2010/0266004 A1* | 10/2010 | Aoki | H04B 3/46 375/226 |

OTHER PUBLICATIONS

R. Cameron and B. Woerner, "Performance analysis of CDMA with imperfect power control," in IEEE Transactions on Communications, vol. 44, No. 7, pp. 777-781, Jul. 1996.
R. Chakravarthy et al. "Primary User authentication of cognitive radio network using underlay waveform," 2017 Cognitive Communications for Aerospace Applications Workshop (CCAA), Cognitive Communications for Aerospace Applications Workshop (CCAA), 2017.
J. H. Cho and J. S. Lehnert, "Performance of a spatio-temporal matched filter receiver for DS/SSMA communications," in IEEE Journal on Selected Areas in Communications, vol. 18, No. 8, pp. 1505-1515, Aug. 2000.
G. E. Corazza and A. Vanelli-Coralli, "Burst vs. continuous pilot acquisition in wideband CDMA cellular mobile systems," WCNC. 1999 IEEE Wireless Communications and Networking Conference (Cat. No. 99TH8466), New Orleans, LA, 1999, pp. 1080-1084 vol. 3.
C. Du, H. Zeng, W. Lou and Y. T. Hou, "On cyclostationary analysis of WiFi signals for direction estimation," 2015 IEEE International Conference on Communications (ICC), London, 2015, pp. 3557-3561.
M. Fine and F. A. Tobagi, "Demand Assignment Multiple Access Schemes in Broadcast Bus Local Area Networks," in IEEE Transactions on Computers, vol. C-33, No. 12, pp. 1130-1159, Dec. 1984.
J. H. Fischer, J. H. Cafarella, C. A. Bouman, G. T, Flynn, V. S. Dolat and R. Boisvert, "Wide-band packet radio for multipath environments," in IEEE Transactions on Communications, vol. 36, No. 5, pp. 564-576, May 1988.
F. Harris, C. Dick, and M. Rice, "Digital receivers and transmitters using polyphase filter banks for wireless communications," IEEE Trans. On Microwave Theory and Techn., vol. 51, pp. 1395-1412, Apr. 2003.
G. Heidari-Bateni and C. D. McGillem, "A chaotic direct-sequence spread-spectrum communication system," in IEEE Transactions on Communications, vol. 42, No. 234, pp. 1524-1527, Feb./Mar./Apr. 1994.
R. M. Hewlitt and E. S. Swartzlantler, "Canonical signed digit representation for FIR digital filters," 2000 IEEE Workshop on Signal Processing Systems. SiPS 2000. Design and Implementation (Cat. No. 00TH8528), Lafayette, LA, 2000, pp. 416-426.

G. Kaddoum and F. Gagnon, "Design of a High-Data-Rate Differential Chaos—Shift Keying System," in IEEE Transactions on Circuits and Systems II: Express Briefs, vol. 59, No. 7, pp. 448-452, Jul. 2012.
T. K. Ksheerasagar, S. Anuradha, G. Avadhootha, K. S. R. Charan and Sri Hari Rao P, "Performance analysis of DS-CDMA using different chaotic sequences," 2016 International Conference on Wireless Communications, Signal Processing and Networking (WiSPNET), Chennai, 2016, pp. 2421-2425.
Jing Lei and Tung-Sang Ng, "Pilot-tone-based maximum likelihood estimator for carrier frequency offset in OFDM systems," Communications, 2003. ICC '03. IEEE international Conference on, 2003, pp. 2046-2050 vol. 3.
S. J. Lee and J. Ahn, "Acquisition performance improvement by Barker sequence repetition in a preamble for DS-CDMA systems with symbol length spreading codes," in IEEE Transactions on Vehicular Technology, vol. 52, No. 1, pp. 127-131, Jan. 2003.
J. Iinatti, "Matched filter code acquisition of burst and continuous pilot signal in Doppler shift," 11th IEEE International Symposium on Personal Indoor and Mobile Radio Communications. PIMRC 2000. Proceedings (Cat. No. 00TH8525), London, 2000, pp. 1276-1280 vol. 2.
J. Lindenlaub and K. Chen, "Performance of Matched Filter Receivers in Non-Gaussian Noise Environments," in IEEE Transactions on Communication Technology, vol. 13, No. 4, pp. 545-547, Dec. 1965.
J. Low and S. M. Waldstein, "A Direct Sequence Spread—Spectrum Modern for Wideband HF Channels," MILCOM 1982—IEEE Military Communications Conference—Progress in Spread Spectrum Communications, 1982, pp. 29.6-1-29.6-6.
A. Martin, Y. Hasan and R. M. Buehrer, "Physical layer security of hybrid spread spectrum systems," 2013 IEEE Radio and Wireless Symposium, Austin, TX, 2013, pp. 370-372.
A.J. Michaels and D. B. Chester, "Efficient and flexible chaotic communication waveform family," 2010—MILCOM 2010 Military Communications Conference, San Jose, CA, 2010, pp. 1250-1255.
A. J. Michaels and D. B. Chester, "Adaptive correlation techniques for spread spectrum communication systems," MILCOM 2016—2016 IEEE Military Communications Conference, Baltimore, MD, 2016, pp. 678-681.
A. J. Michaels and C. Lau, "Generalized Multi-carrier Chaotic Shift Keying," 2014 IEEE Military Communications Conference, Baltimore, MD, 2014, pp. 657-662.
A.J. Michaels, "High-Order PSK Signaling (HOPS) Techniques for Low-Power Spread Spectrum Communications," Military Communications Conference (MILCOM) 2017, pp. [submitted].
A. Michaels, "Digital Chaotic Communications," PhD Dissertation, Georgia Institute of Technology, 2009.
A. Michaels, "A maximal entropy digital chaotic circuit," in Circuits and Systems (ISCAS), 2011 IEEE International Symposium on, vol., No., pp. 717-720, May 15-18, 2011.
A. Michaels, "Improved RNS-based PRNGs" in IEEE Military Communications Conference (MILCOM), [submitted], 2017.
A. J. Michaels and C. C. Lau, "Quantization Effects in Digital Chaotic Communication Systems," MILCOM 2013—2013 IEEE Military Communications Conference, San Diego, CA, 2013, pp. 1564-1569.
A. Mpitziopoulos, D. Gavalas, C. Konstantopoulos and G. Pantziou, "A survey on jamming attacks and countermeasures in WSNs," in IEEE Communications Surveys & Tutorials, vol, 11, No. 4, pp. 42-56, Fourth Quarter 2009.
E. E. Petrovsky (2018). "Network scaiability comparison of IEEE 802.15.4 and receiver-assigned CDMA," IEEE, 9 total pages.
M. B. Pursley, T. C. Royster and M. Y. Tan, "High-rate direct-sequence spread spectrum," IEEE Military Communications Conference, 2003. MILCOM 2003, pp. 1101-1106 vol. 2.
N. X. Quyen, C. T. Nguyen, P. Barlet-Ros and R., Dojen, "A novel approach to security enhancement of chaotic DSSS systems," 2016 IEEE Sixth International Conference on Communications and Electronics (ICCE), Ha Long, 2016, pp. 471-476.

(56) References Cited

OTHER PUBLICATIONS

S. A. Rabee, B. S. Sharif and S. Sali, "An efficient algorithm for distributed power control in cellular radio systems," Third International Conference on 3G Mobile Communication Technologies, 2002, pp. 123-127.

M. Spellman, "A Comparison between Frequency Hopping and Direct Spread PN as Antijam Techniques," MILCOM 1982—IEEE Military Communications Conference—Progress in Spread Spectrum Communications, 1982, pp. 14.4-1-14.4-6.

M. K. Sust and A. Goiser, "A combinatorial model for the analysis of digital matched filter receivers for direct sequence signals," Global Telecommunications Conference and Exhibition 'Communications Technology for the 1990s and Beyond' (GLOBECOM), 1989. IEEE, Dallas, TX, 1989, pp. 1634-1640 vol. 3.

H. H. Takada and A. Anzaloni, "On Bandwidth Allocation for Demand-Assignment Multiple Access Systems," 2006 International Conference on Communication Technology, Guilin, 2006, pp. 1-4.

F. Tufvesson, S. Gezici and A. F. Molisch, "Ultra-Wideband Communications using Hybrid Matched Filter Correlation Receivers," in IEEE Transactions on Wireless Communications, vol. 5, No. 11, pp. 3119-3129, Nov. 2006.

D. Yan and P. Ho, "Code acquisition in a CDMA system based on Barker sequence and differential detection," in IEEE PIMRC'95, Toronto, ON, Canada, 1995, pp. 233-236.

Young-Hyun Oh and D. J. Thuente, "Enhanced security of random seed DSSS algorithms against seed jamming attacks," 2012 IEEE Global Communications Conference (GLOBECOM), Anaheim, CA, 2012, pp. 801-806.

J. Yu, H. Li, Y. d. Yao and N. J. Vallestero, "LPI and BER Performance of a Chaotic CDMA System," IEEE Vehicular Technology Conference, Montreal, Que., 2006, pp. 1-5.

W. S. Yuan and C. N. Georghiades, "Rapid carrier acquisition from baud-rate samples," in IEEE Transactions on Communications, vol. 47, No. 4, pp. 631-641, Apr. 1999.

A. A. Zaher, "An improved chaotic shift keying technique." *2012 5th International Symposium on Communications, Control and Signal Processing*, Rome, 2012, pp. 1-4.

\* cited by examiner

COMMUNICATION SYSTEM EMPLOYING CHAOTIC SEQUENCE BASED FREQUENCY SHIFT KEYING SPREADING SIGNALS

CROSS-REFERENCE TO RELATED APPLICATIONS

This application claims priority to, and the benefit of, U.S. Provisional Application No. 62/489,041, filed Apr. 24, 2017, entitled CHAOTIC SEQUENCE BASED FREQUENCY SHIFT KEYING, the disclosure of which is incorporated herein by reference in its entirety.

BACKGROUND

Virtually all sequence-based spread spectrum systems are based on the interpretation of a stream of independent and identically distributed (iid) random variables translated to discrete phase words. These phase words are subsequently combined as a time series into a bandlimited spread spectrum communications signal, and traditionally combined via spreading operations with phase-shift keying (PSK)-based data words. In direct sequence spread spectrum (DSSS) modulations, the discrete phase words are typically selected as 2-ary or 4-ary PSK-based spread modulations, effectively representing a higher rate version of a standard BPSK or QPSK modulation. In chaotic sequence spread spectrum (CSSS) modulations, the discrete phase words may be represented as arbitrary-phase modulations that are drawn as nearly random points on the unit circle, representable by phases such as $2^8$-ary up to $2^{16}$-ary PSK modulations. The increased order of the representative PSK modulation produces a whiter overall spectral response. Ignoring windowing effects, the spectral content can be approximated as consisting of concentrations of energy represented by the phase difference between each successive iid phase word (instantaneous frequency being approximated as the rate of change of phase within the chosen chip periods), which if drawn from a uniform distribution, will also be uniform, and therefore generate an approximately white communications signal.

SUMMARY

Disclosed herein is a candidate arbitrary-phase spread spectrum modulation technique and associated apparatus that offers similar performance to spread continuous phase modulation (CPM) or CSSS waveform techniques, yet offers additional capabilities for programming a chosen frequency domain spectra into the resulting spread spectrum signal. The proposed chaotic-FSK waveform may be derived from high-order sequence-based spread spectrum signals, with multi-bit resolution chaos-based sequences defining incremental phase words, enabling real-time efficient generation of practically non-repeating waveforms. A result of the C-FSK formulation is a parameterized hybrid modulation capable of acting like a traditional sequence-based spread spectrum signal or a traditional frequency shift keying signal depending on chosen parameters. As such, adaptation in this modulation may be easily implemented as a time-varying evolution, increasing the security of the waveform while retaining many efficiently implementable receiver design characteristics (no MLSE algorithms required) of traditional PSK modulations. Most importantly, the chaotic-FSK modulation enables selective frequency controls that color the resulting frequency spectrum of the transmitted signal into a non-white, or equivalently non-uniform, communications signal that can mitigate the impact of interfering signal operating within its band.

In one aspect the disclosure relates to an apparatus for generating a communications signal. The apparatus includes a pseudorandom number generator for providing a sequence of pseudorandom phase words. A mapping module includes a color mapping table containing phase value information. The mapping module is configured to provide an output phase word sequence by phase mapping the sequence of pseudorandom phase words in accordance with the phase value information. A modulator is operative to generate the communications signal using the output phase word sequence wherein a frequency domain spectra of the communications signal is determined in accordance with the phase value information.

In another aspect the disclosure relates to a transmitter including an encoder for generating encoded data symbols based upon input data provided by a data source. The transmitter further includes a communications signal generator having a pseudorandom random number generator for providing a sequence of pseudorandom phase words. The communications signal generator further includes a mapping module including a color mapping table containing phase value information. The mapping module is configured to provide an output phase word sequence by phase mapping the sequence of pseudorandom phase words in accordance with the phase value information. The communications signal generator also includes a modulator operative to generate a spreading sequence using the output phase word sequence wherein a frequency domain spectra of the spreading sequence is determined in accordance with the phase value information. A transmit signal generator is operative to generate a transmit signal by spreading the encoded data symbols using the spreading sequence.

The disclosure is also directed to a transceiver apparatus including a receiver including a channel state information module configured to provide channel state information based upon a received signal. A color mapping table stores phase value information wherein the phase value information is determined based at least in part upon the channel state information. A communications signal generator is configured to generate a communications waveform. The communications signal generator includes a mapping module operative to introduce a selected frequency domain spectra into the communications waveform in accordance with the phase value information.

The disclosure also pertains to a method for generating a communications signal. The method includes providing a sequence of pseudorandom phase words. The method further includes generating a color mapping table containing phase value information. An output phase word sequence is provided by phase mapping the sequence of pseudorandom phase words in accordance with the phase value information. The method further includes generating the communications signal using the output phase word sequence wherein a frequency domain spectra of the communications signal is determined in accordance with the phase value information.

In yet another aspect the disclosure relates to a method which includes generating encoded data symbols based upon input data provided by a data source. The method further includes providing a sequence of pseudorandom phase words and generating a color mapping table containing phase value information. An output phase word sequence is provided by phase mapping the sequence of pseudorandom phase words in accordance with the phase value information. A spreading sequence is generated using the output phase word sequence wherein a frequency domain spectra of the spreading sequence is determined in accordance with the phase value information. A transmit signal is generated by spreading the encoded data symbols using the spreading sequence.

The disclosure is also concerned with a method which includes providing channel state information based upon a received signal. The method further includes storing phase value information wherein the phase value information is determined based at least in part upon the channel state information. A communications waveform is generated, in accordance with the phase value information, to have a selected frequency domain spectra determined by the phase value information.

BRIEF DESCRIPTION OF THE DRAWINGS

The present invention is described with reference to the accompanying drawings. In the drawings, like reference numbers indicate identical or functionally similar components.

DETAILED DESCRIPTION

I. Overview

Disclosed herein are embodiments of a chaotic frequency shift keying (CFSK) modulation system and technique useful in generating a spread spectrum communication signal having a tailored or, equivalently, "colored" frequency spectra. The disclosed arbitrary-phase spread spectrum modulation technique offers the opportunity to effectively program a chosen frequency domain spectra into a spread spectrum communication signal produced using the proposed chaotic-FSK waveform as a spreading signal. The chaotic-FSK waveform may be derived from a sequence of multi-bit phase words produced by a pseudorandom number generator. More particularly, the pseudorandom multi-bit phase words may undergo a color mapping process to define a sequence of incremental phase words, thereby enabling real-time efficient generation of practically non-repeating waveforms. As is discussed below, such chaotic-FSK waveforms facilitate a parameterized hybrid modulation scheme capable of acting like a traditional sequence-based spread spectrum signal or a traditional frequency shift keying signal depending on chosen parameters. As such, adaptation in the disclosed modulation scheme may be easily implemented as a time-varying evolution, increasing the security of the waveform while retaining many efficiently implementable receiver design characteristics (i.e., no maximum likelihood sequence estimation, MLSE, algorithms required) of traditional PSK modulations.

Before describing the details of the present chaotic sequence based frequency shift keying spreading techniques, it will be helpful in understanding an exemplary communication environment in which the disclosed techniques may be utilized.

Figure 1:
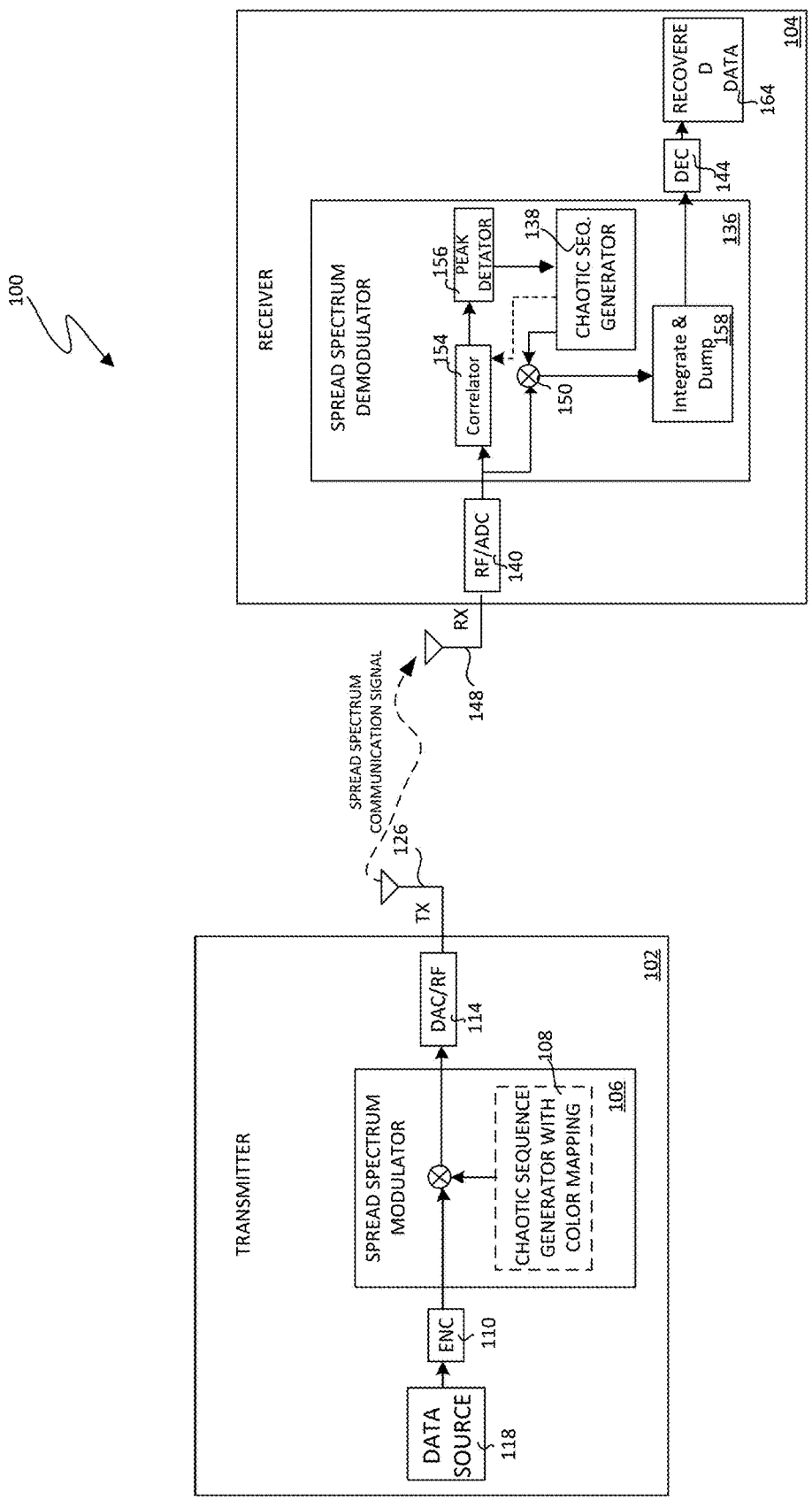
FIG. 1 provides a simplified schematic illustration of an embodiment of a communication system utilizing chaotic sequence based frequency shift keying spreading techniques.

Attention is now directed to FIG. 1, which provides a simplified schematic illustration of an embodiment of a communication system 100 utilizing the present chaotic sequence based frequency shift keying spreading techniques. As shown in FIG. 1, the communication system 100 includes one or more transmitters 102 and one or more receivers 104. Each transmitter 102 may be configured to generate a spread spectrum communication signal characterized by chaotic properties. Alternatively, the transmitters 102 may be configured to produce a high-order PSK signaling (HOPS) signal using low-power generation techniques. As shown, each transmitter 102 includes a spread spectrum modulator 106 having a chaotic sequence generator 108 configured for spectral color mapping in accordance with the disclosure. Each transmitter 102 also includes an encoding subsystem 110, a DAC/RF subsystem 114, and a data source 118.

Data source 118 may be implemented as an interface though which an externally-provided input signal is received. During operation of the transmitter 102, data source may supply bits of data to the encoding subsystem 110 at a specified data rate.

The encoding subsystem 110 may conventionally encode the data provided by the data source 118 and format the encoded data into symbols. For example, the encoded data may be formatted into phase shift keyed (PSK) symbols (e.g., QPSK symbols). The encoding subsystem may also include conventional sample rate matching structures so that a sample rate of the PSK symbol data matches that of a digital chaotic-FSK sequence generated by the chaotic sequence generator 108 in the manner described hereinafter.

The spread spectrum modulator 106 includes a complex multiplier 120 operative to perform complex-valued digital multiplication operations using the encoded digital symbol data from the encoding subsystem 110 and the digital chaotic-FSK sequence provided by the chaotic sequence generator 108. The output of the complex multiplier yields a digital IF signal which may be characterized as a spread spectrum chaotic-FSK signal. It will be appreciated that increasing the ratio between the period of the encoded symbol data and the sample period of the chaotic-FSK sequence increases the associated spreading gain.

Within the DAC/RF subsystem 114, the spread spectrum chaotic-FSK signal may be conventionally interpolated, converted to analog form using a digital to analog converter (DAC), and upconverted in frequency to an RF signal. The RF signal may then be amplified and transmitted as a spread spectrum communication signal using an antenna 126.

As shown, each receiver 104 includes a spread spectrum demodulator 136 having a chaotic sequence generator 138 essentially identical to the chaotic sequence generator 108 within the transmitter 102. Each receiver 104 also includes an RF front end subsystem 140 and a decoding subsystem 144.

After being received by antenna 148 of receiver 104, the spread spectrum communication signal communicated from the transmitter 102 is provided to the RF front end subsystem 140 in which it may be conventionally amplified, downconverted in frequency to an IF, filtered and converted to a digital signal using an analog to digital (A/D) converter. Additionally, although not shown, the RF front end subsystem 140 may be configured to include a frequency selective equalizer that pre-processes the received signal before passing to the spread spectrum demodulator 136.

The spread spectrum demodulator 136 may be configured for de-spreading the transmitted spread spectrum communication signal after processing by the RF front end subsystem 140. This de-spreading may be effected by correlating the received signal with a replica of the chaotic-FSK signal generated at the transmitter 102. To this end, the demodulator 136 includes a correlator 154, a peak detector 156, a complex multiplier 150 configured for complex multiplying digital words provided by the RF front end subsystem 140 by digital words defining the chaotic-FSK signal produced by the chaotic sequence generator 138.

A correlator 154 is configured for correlating the received baseband chaotic-FSK signal with a digital signal based upon an output of the chaotic sequence generator 138. The sequence values provided from the chaotic sequence generator 138 to the correlator 154 are used to define an acquisition preamble that is used to discriminate the presence of an incoming signal preamble (or other known signal content). Following the correlator 154 is a peak detector 156 that translates the outputs of the correlator 154 to determine the presence and timing of the incoming signal preamble. Not shown are optional phase, frequency, and timing tracking loops that follow traditional sequence-based spread spectrum communications receiver designs. Upon detection of a preamble by the peak detector 156, timing, frequency, and phase information are provided to the chaotic sequence generator 138, which may be configured to correct for those observed offsets. The chaotic sequence generator 138 then produces a complex conjugate of the spreading signal, modified for the phase, frequency, and timing offsets as appropriate for communication to the complex multiplier 150. Following the complex multiplier 150 is an accumulate & dump circuit 158 that assists with translation from despread spread spectrum chips into data symbols. During steady state operation of the receiver 104, the output produced by the integrate & dump circuit 158 corresponds to "soft decisions" of PSK symbols. These PSK soft decisions may be provided to the decoder 144, which is configured to render final decisions with respect to each soft decision and thereby produce a recovered symbol stream. The recovered symbol stream may then be conventionally decoded into recovered data 164 corresponding to an estimate of the input data provided by the data source 118. Although not shown, traditional mechanisms for data frame verification like cyclic redundancy checks (CRC) or forward error correction (FEC) processing may be inserted into the decoder's 144 processing to improve error rate performance.

II. Chaotic Frequency Shift Keying Methods

As noted above, embodiments of a chaotic frequency shift keying (CFSK) modulation system and technique may be useful in generating a spread spectrum communication signal having a "colored" frequency response selected in accordance with, for example, channel conditions or other criteria. In one aspect, the disclosed embodiments facilitate coloring or otherwise programming a desired frequency response within a chaotic spreading signal by using an accumulator element to aggregate phase differences between pseudorandom spreading chips provided by, for example, a PRNG. As is discussed below, this hardware structure of a PRNG and an accumulator may be easily extended to enable color mapping information to determine the frequency response characteristics of the chaotic spreading signal provided at the output of the structure.

Accordingly, presented herein is a candidate reinterpretation of the $2^k$-ary PRNG output as an iid phase word to instead be an accumulated phase increment whose sum rolls over uniformly on each new PRNG value. By so doing, easy additions may be incorporated to programmably define a spread spectrum output signal that contains tailored/colored frequency responses, which cannot be achieved when phase words are taken as uniformly distributed iid entities. The ability to uniquely color the spectrum of the output signal offers new advantages for optimizing transmission in a non-white or frequency dispersive channel as well as mitigating interference observed in the channel.

This Section II introduces a foundational framework for the chaotic frequency shift keying (CFSK) modulation concept and includes a discussion of methods to increase the adaptability in the CFSK spreading process. This is followed by an analysis of the CFSK techniques, including extensibility to optimized implementation on different types of hardware platforms in Section III; a proof-of-concept fixed-point implementation of the CFSK modulator was constructed in Simulink and subsequently translated into Verilog for verification on an Altera Cyclone V FPGA.

Figure 2:
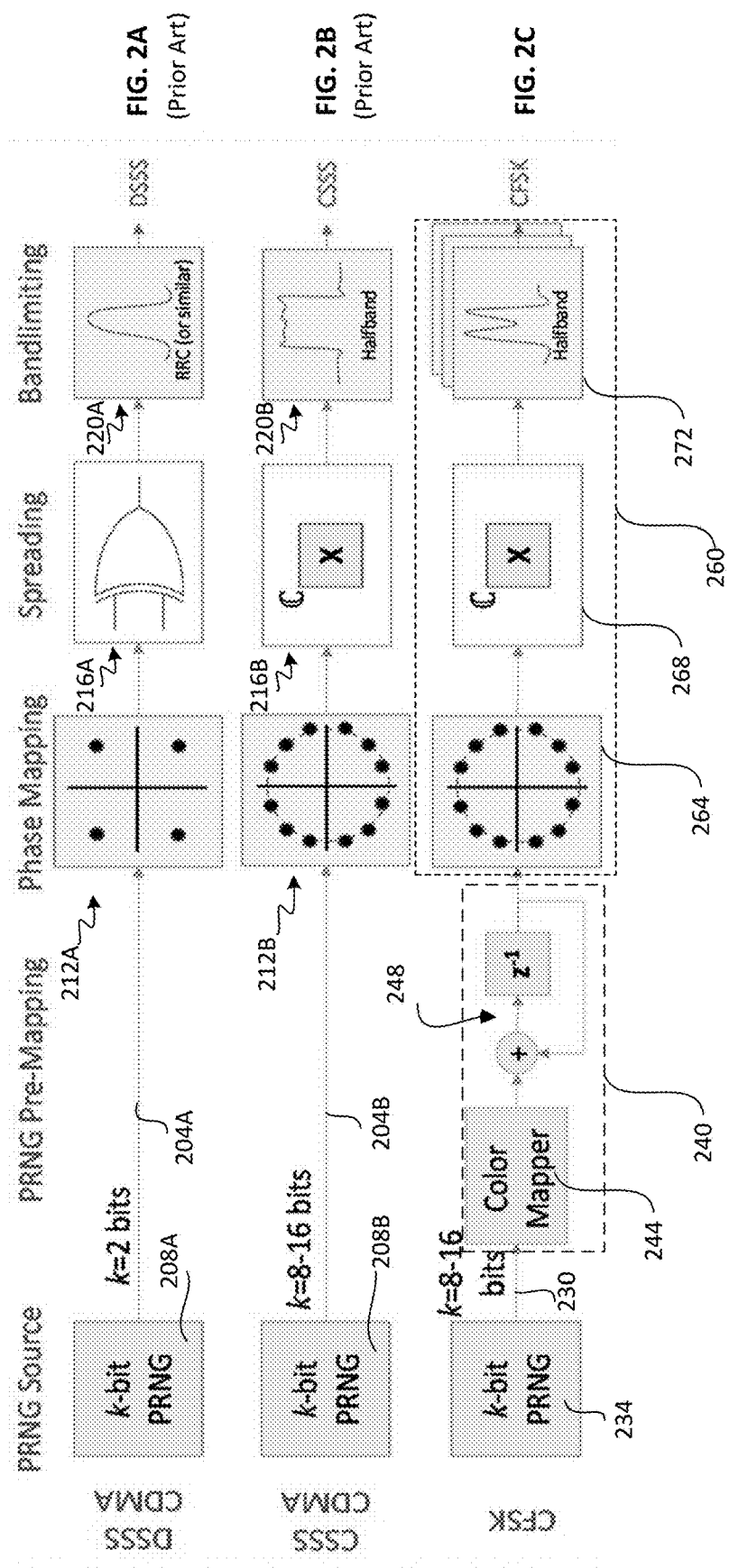
FIG. 2A depicts an exemplary spread spectrum spreading mechanism for DSSS.
FIG. 2B depicts an exemplary spread spectrum spreading mechanism for CSSS.
FIG. 2C illustrates an exemplary spread spectrum spreading mechanism for CFSK, according to an embodiment.

Attention is now directed to FIGS. 2A-2C, which comparatively illustrate architectures for signal generators configured to implement different sequence-based spread spectrum generation processes. Specifically, FIGS. 2A and 2B respectively represent signal generation architectures for traditional sequence-based spread spectrum generation processes in the form of DSSS and CSSS, respectively. As shown, in the spread spectrum generation processes of FIGS. 2A and 2B, phase words 204A, 204B from pseudo-random number generators (PRNG 208A, 208B) are conventionally phase mapped 212A, 212B, spread 216A, 216B and bandlimited 220A, 220B to yield DSSS and CSSS signals, respectively.

FIG. 2C represents an architecture for a signal generator configured to implement a modified chaotic frequency shift keying (CFSK) process in accordance with an embodiment of the disclosure. The signal generator includes a pseudo-random number generator (PRNG) 234, a deterministic and programmable color mapping module 240 and a spread spectrum modulator 260 configured to produce a chaotic-FSK (CFSK) output stream. The spread spectrum modulator 260 includes a phase mapper 264, a spreading module 268 and a halfband filter 272.

As shown in FIG. 2C, in the CFSK process the multi-bit resolution binary words 230 from PRNG 234 are provided to the color mapping module 240. During operation, the assumed uniformly distributed PRNG words 230 (values on $GF(2^k)$) may be surjectively mapped by the color mapping module 240 onto any chosen subset of $GF(2^k)$. The simplest such case(s) are (1) that of a bypass/no-operation where the k-bit input/output words of the color mapping are identical and (2) that of an arbitrary permutation (a bijective mapping) of PRNG values. Both cases maintain the identical statistical distribution as the input, so no change to the power spectral density is induced. It should be noted that the permutation case (2) offers potentially higher levels of security since the permutation may be programmed to any value, provided it is matched by the intended receiver, thus changing the effective phase mappings of the modulated signal.

As shown, the color mapping module 240 includes a color mapping unit 244 containing and an accumulator structure 248. The color mapping module 240 contains a color mapping table of phase pre-mapping mapping values. In one respect the accumulator structure 248 represents an interpretation of the output of the PRNG 234 as an additive phase increment/instantaneous frequency word, acting much like a variable-input numerically controlled oscillator (NCO). In these scenarios, the bulk signal properties are identical to the multi-bit resolution style CSSS signals. In other embodiments the color mapping table of the color mapper 244 comprises an adaptable array of values representative of a surjective mapping from the input $GF(2^k)$ domain onto a chosen subset of values.

In yet other embodiments, the output of the PRNG 234 represents a sequence of phase difference values (derivative of phase). In this embodiment the color mapping module 240 further includes an integrator operative to perform an integration of the sequence of phase difference values (with the recognition that phase is circularly symmetric). In this way the color mapping module 240 synthesizes a phase stream that is subsequently employed to modulate the spreading chips generated by spread spectrum modulator 260.

As mentioned above, the color mapping table of the color mapper 244 may comprise an adaptable array of values representative of a surjective mapping from the input $GF(2^k)$ domain onto a chosen subset of values. A few scenarios for this surjective mapping include (1) uniform definition of the color mapping table to be a single phase value, producing a continuous wave (CW) signal, (2) subdivision of the $2^k$ memory entries of the color mapping table of the color mapper 244 into a discrete number of M allowable phases, establishing a discrete number of phase steps (instantaneous frequency content) that are reflective of a traditional M-ary frequency shift keying (FSK) modulation where each symbol in the FSK constellation may be arbitrarily weighted, (3) non-uniform definition of the color mapping table to uniquely allocate frequency content into specific bins, (4) a time-varying programmable set of phase values that achieve any of the previously described modes or newly developed ones, (5) an externally or internally driven swap between parallel instantiated phase word tables, and/or (6) a rapid spread bandwidth expansion/contraction selection. These scenarios are further described below.

A. CW Signals

The color mapper 244 may be configured to act as a straightforward continuous input (at any chosen center frequency) to the accumulator structure 248, truly acting as a numerically controlled oscillator. This function may be used as a pilot tone, a time-adapted CW pulse (an FSK modulation with variability in symbol durations), and/or as a test tone signal for obtaining detailed characterization of the output chain.

B. Static FSK

By sub-dividing the $2^k$ allowable phase outputs into a discrete set, an M-ary FSK signaling set may be assumed, where each FSK pulse occurs over a single or defined number of chip durations. As such, the CFSK modulator 260 may be configured for traditional FSK signals, yet still be synchronized to the underlying spreading sequence generator.

C. Dynamic FSK

By dividing the $2^k$ allowable phase outputs over a much larger discrete set, and specifically in a non-uniform manner, allowing discrete control of the unfiltered power spectral density of the resulting spectrum, under the assumption of a uniformly distributed input. Filtering of these interleaved FSK "chips" will distort the spectrum in a manner that limits the nulls in unselected bins, but does enable coarse shaping of the signal spectrum in a way to avoid interferers and/or optimally equalize the spread signal in a frequency dispersive propagation environment.

Figure 3:
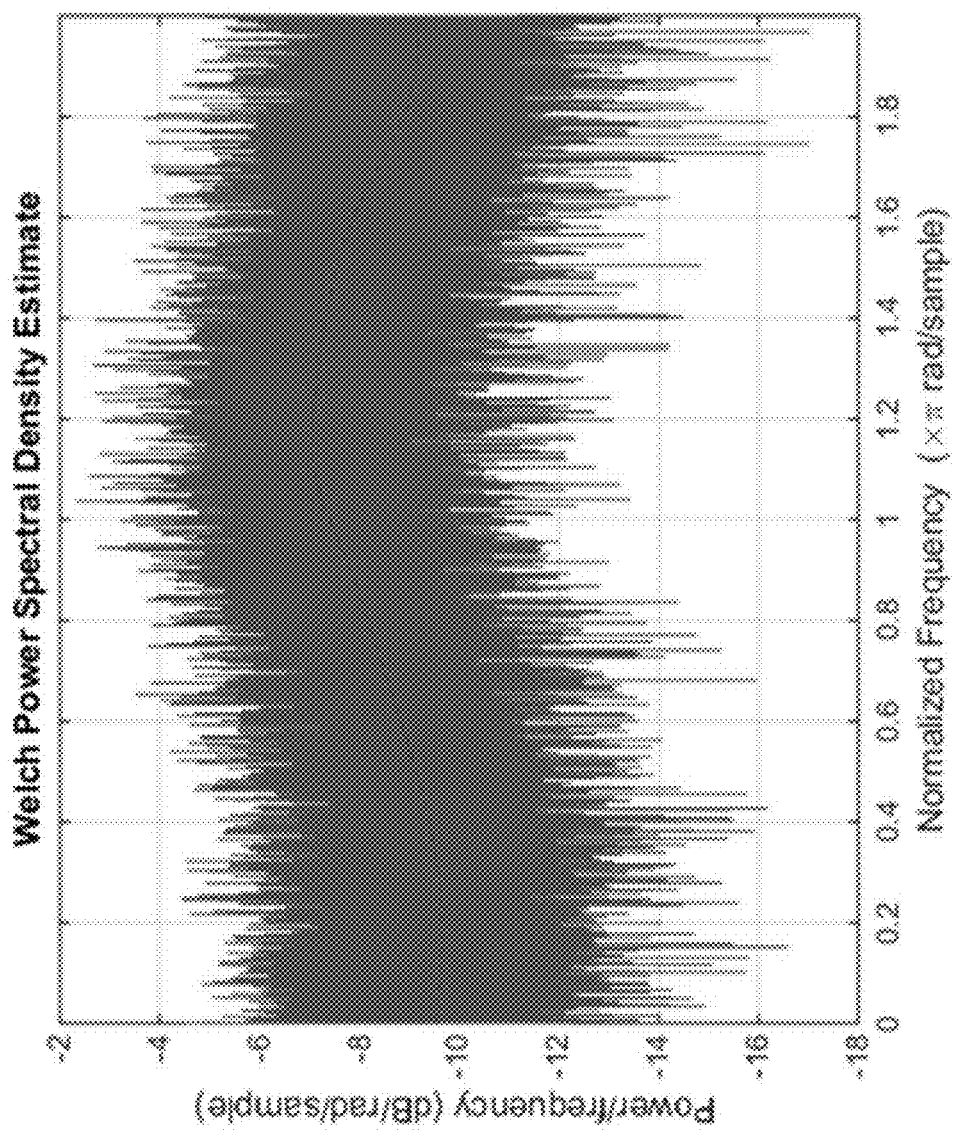
FIG. 3 shows an exemplary power spectral density of an output produced using a dynamic FSK spreading configuration.

Attention is now directed to FIG. 3, which shows an exemplary power spectral density of an output produced using a dynamic FSK spreading configuration. The exemplary dynamic FSK mode of FIG. 3 was implemented in Matlab to emulate the spectral effects of accentuating one side of a signal's instantaneous bandwidth by approximately 2 dB.

More extreme shaping may also be performed, although in one embodiment the core assumption of "shaping" is that the total power is conserved, so accentuating half a band by 3 dB represents a null in the other half of the band. The traditional correlation process of despreading remains identical, leading to no additional losses. Note that the signal spectrum shown in FIG. 3 represents the spectrum of a maximal entropy (one complex sample per chip) signal, so no band limiting/interpolation filter has been applied except the inherent windowing of the Fast Fourier Transform, FFT.

D. Programmable Color Maps

By enabling the color mapping to be a time-varying vector of phase words, (1) a CW signal may be converted to a short duration arbitrary phase chirp signal, (2) the static FSK symbol set/center frequencies may be re-defined, and/or (3) the chosen frequency spectra of a dynamic FSK model may be changed to meet observed changes in propagation or interferers. This programmable characteristic may be updated periodically, based on an external pseudorandom process, and/or on a burst-by-burst basis, offering additional waveform entropy. The most common anticipated use for the adaptation is coupling with an RF interference (RFI) measurement/scanning receiver that now permits re-shaping of the signal in addition to changing channels as part of a dynamic spectrum access algorithm.

In one embodiment, the color mapper 244 may be swapped to occur after the accumulator structure 248, enabling better timing/code synchronization between two end points, since the intervals over which the phase words accumulate should be perfectly aligned at the transmitter 102 and receiver 104.

E. Selectable Color Maps

Another bandwidth-preserving mechanism is to employ multiple color mapping tables within the color mapper 244 and to then select between them based on, for example, some portion of the k-bit output of the PRNG 234, an externally provided control signal (periodic or nonperiodic), or an externally provided PRNG source. Selection between these color mapping tables may also be data dependent, allowing integration of CFSK spreading mechanisms with carrier shift keying (CSK) modulations.

In the implementations discussed above, the waveforms retain the constant envelope characteristic, making them power efficient from a transmission perspective, and the arbitrary phase behavior that lends security from an unintended recipient (on par with the quality of the k-bit PRNG). Correlation processing using a coherent replica of the signal inside the receiver 104 remains a robust option on par with traditional correlation techniques applied to sequence-based spread spectrum. In other embodiments amplitude shaping or mapping may also be applied to, for example, increase security.

Figure 4:
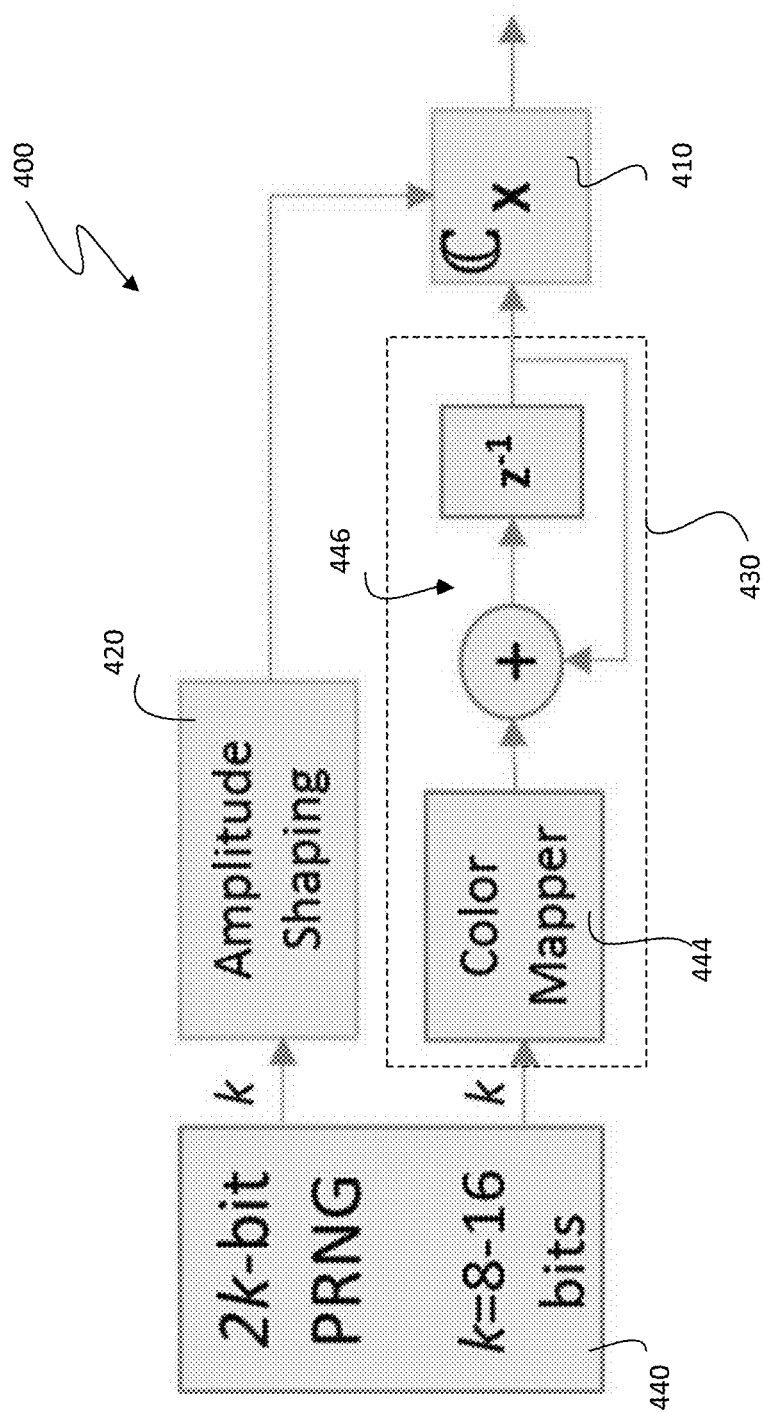
FIG. 4 illustrates an exemplary arrangement including an CFSK modulator configured with amplitude mapping.

For example, attention is now directed to FIG. 4, which illustrates an exemplary color-mapped CFSK signal generator 400. The signal generator 400 includes a CFSK modulator 410 configured with amplitude shaping 420, a color mapping module 430 and a PRNG 440. The color mapping module 430 includes a color mapper 444 and an accumulator structure 446. The signal generator 400 enables chip energy amplitude shaping, such as used with Gaussian-shaped digital CSSS signals, to also be optionally applied in order to increase the security of the signal, while retaining a chosen colored spectra.

F. Spreading Bandwidth Expansion and Contraction

In one embodiment variable-bandwidth controls may also be applied to the overall spreading sequence. By incorporating a gain term ($\delta \le 1$) after the color mapper (or equivalently within the color mapping values), the instantaneous bandwidth of the signal may be constrained to $\delta$% of the overall bandwidth; i.e. each successive incremental phase word will use a non-complete portion of the overall available spectrum when viewed at the chip rate. By making this $\delta$ term an externally controlled parameter, the bandwidth may be varied on a symbol-by-symbol basis (total energy per symbol is conserved), enabling yet another free parameter for encoding data into the spread signal.

Figure 5:
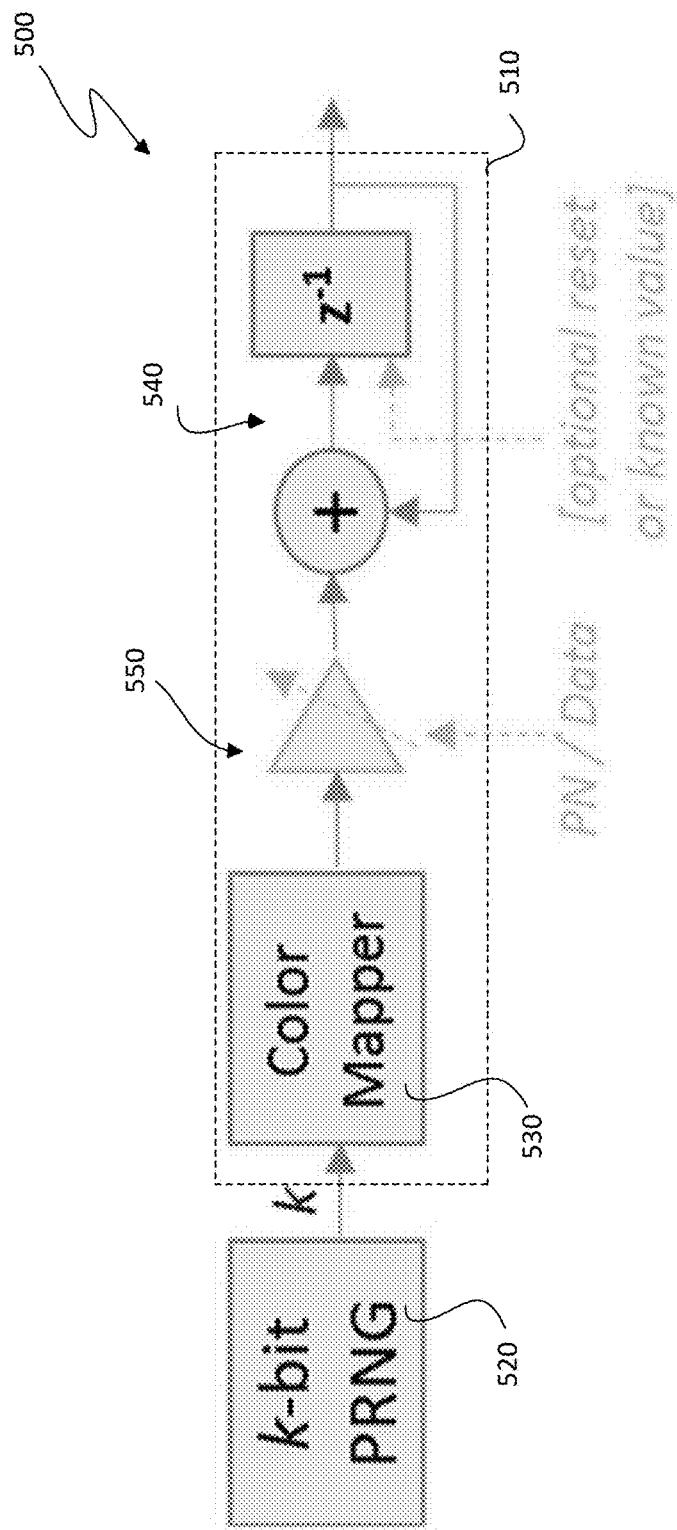
FIG. 5 illustrates exemplary data-driven or time-varying signal bandwidth contraction and expansion in spread spectrum systems.

FIG. 5 illustrates an exemplary apparatus 500 configured to effect data-driven or time-varying signal bandwidth contraction and expansion in a spread spectrum system obtained by making the $\delta$ term an externally controlled parameter. As shown, the apparatus 500 includes a color mapping module 510 and a PRNG 520. The color mapping module 510 includes a color mapper 530, an accumulator structure 540 and a gain element 550. In one embodiment the gain element 550 enables the bandwidth of a spread spectrum signal produced by a signal generator incorporating the apparatus 500 to be varied (e.g., in response to a data signal or a PN signal) on a symbol-by-symbol basis.

Another implementation of variable-bandwidth controls using the gain word is to periodically slew the bandwidth of a spread spectrum communications signal, reducing its signature under rate line detection techniques. Choosing a value of $\delta > 1$ results in periodic aliasing of the phase increments (rollover within the accumulator), and equivalently an aliasing of the spectrum, yet may also be used.

The resulting waveform produced by applying variable-bandwidth controls to the spreading sequence will remain constant envelope and present similar computational challenges for reception as a CPM signal. Most notably, the phase of the resulting signal accumulates through the duration of a symbol, allowing the option for an accumulator reset (to a known, optionally PN-driven, phase value) between symbols to eliminate most of the CPM-required MLSE processing. With the arbitrary phase nature of the resulting signals, time-domain cross-correlations between signals of different scaled bandwidths will quickly devolve into phase incoherent entities (amplitude scaling will remain coherent if employed) giving solid orthogonality, even though they can start on symbol boundaries at similar values.

With respect to the six CFSK variants identified above, it is noted that the chosen instantaneous frequency components will naturally blur when passed through an interpolation and/or band limiting filter. As such, the programmability of the frequency spectra observed at a symbol level, or any other long-term observation, will be inherently limited in its variation. In other embodiments these transitions could potentially be made tighter by using different types of band limiting filters.

III. Implementation of CFSK

Referring again to FIG. 2C, one primary difference between the disclosed CFSK modulation system and a traditional sequence-based spread spectrum communication system relates to the use of the color mapping circuit and phase word integrator. For relatively small values of k (k<12), implementing the color mapper 244 in a simple lookup table (LUT) offers negligible increases in computational resources for most modern devices. For larger values of k, a structure of smaller LUTs conditioned upon MSBs of the signal is likely the better approach—given the inherent smoothing effect of the subsequent channel filter and the RF output chain, granular frequency controls are less impactful. Stated differently, the practical value of exceeding k=12 bits for phase word precision is offset by the band limiting effects that will occur in the transmission of the signal; the extra precision in phase words also generally provide negligible benefits in deterring observation.

The receiver 104 may be informed of the particular color mapping table utilized by the color mapper 244 by, for example, including this color mapping table information within the preamble of one or more data packets or within a system overhead message. In one embodiment the receiver 104 is configured to store multiple color mapping tables and to select one of these for use during demodulation based upon the color mapping table information received in the chaotic-FSK signal produced by the modulator 260.

The precision of the output of the color mapper 244 is a flexible parameter, preferably chosen with a dynamic range that exceeds resolution provided by k. In cases (a)-(e) of section II, the resolution of the phase word value, and the resulting size of the accumulator structure 248, may be comparable without any loss of performance. The final case (f) of an optional gain term requires consideration of the level of precision desired in the PN/data driven scaling (FIG. 5). Provided the transmitter 102 and receiver 104 use the identical bit width, however, the signals will remain coherent, making the extra precision a minimal impact. Further, choosing a higher output phase word precision has practically no impact on overall system resources.

To validate the CFSK modulation model, a fixed point model (k=8) was implemented in Simulink using the HDL Coder block set, and subsequently translated into Verilog for prototype hardware deployment on an Altera Cyclone V SX FPGA. Relative to the resources available in the FPGA, the added logic is negligible (one 256-entry block RAM and an 8-bit accumulator). This CFSK mode was then coupled with a burst-mode high-order PSK signaling (HOPS) modem and validated both in Simulink and via the hardware prototype to yield similar communications performance to the traditional sequence-based spread spectrum modulations, yet with the ability to coarsely tune the frequency spectrum.

Figure 6:
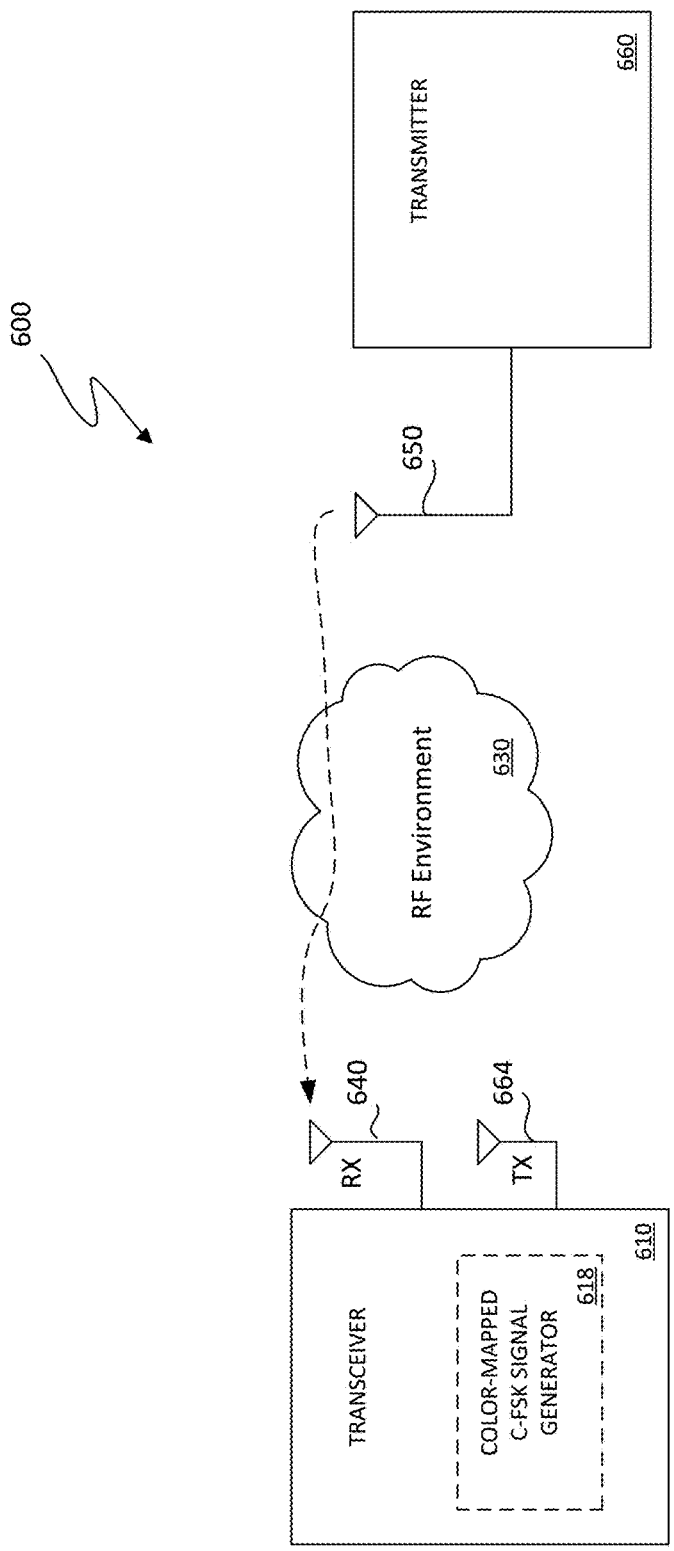
FIG. 6 illustrates a communication system including a transceiver configured with a color-mapped chaotic-FSK signal generator in accordance with an embodiment.

Attention is now directed to FIG. 6, which illustrates a communication system 600 including a transceiver 610 configured with a color-mapped chaotic-FSK signal generator 618 in accordance with an embodiment. In the embodiment of FIG. 6, a receiver subsystem of the transceiver 610 is configured to passively observe the RF environment 630 and thereby derive channel state information (CSI), which is subsequently used to (a) calculate or (b) select from pre-calculated CFSK color tables. That is, a color table is either calculated or selected such that the chaotic-FSK signal transmitted by the transceiver is generated so as to have a desired frequency response characteristic in view of the observed CSI. In one embodiment the RF environment 630 is observed based upon noise and/or interfering signal energy received through RX antenna 640.

In another embodiment the receiver subsystem of the transceiver 610 is configured to derive channel state information (CSI) using a signal transmitted by antenna 650 of transmitter 660. This approach detects channel-specific dispersive effects within the RF environment 630 and is inapplicable to noise-based channel estimation. The CSI may then be subsequently used to (a) calculate or (b) select from pre-calculated CFSK color tables.

Alternatively, the transceiver 610 may emit a signal from transmit antenna 664 and then derive CSI based upon the transmitted signal energy received through antenna 640.

Yet another alternative approach is to (a) calculate or (b) select from pre-calculated CFSK color tables based upon a command from an external or master node, which may or may not be aware of relevant channel conditions.

Figure 7:
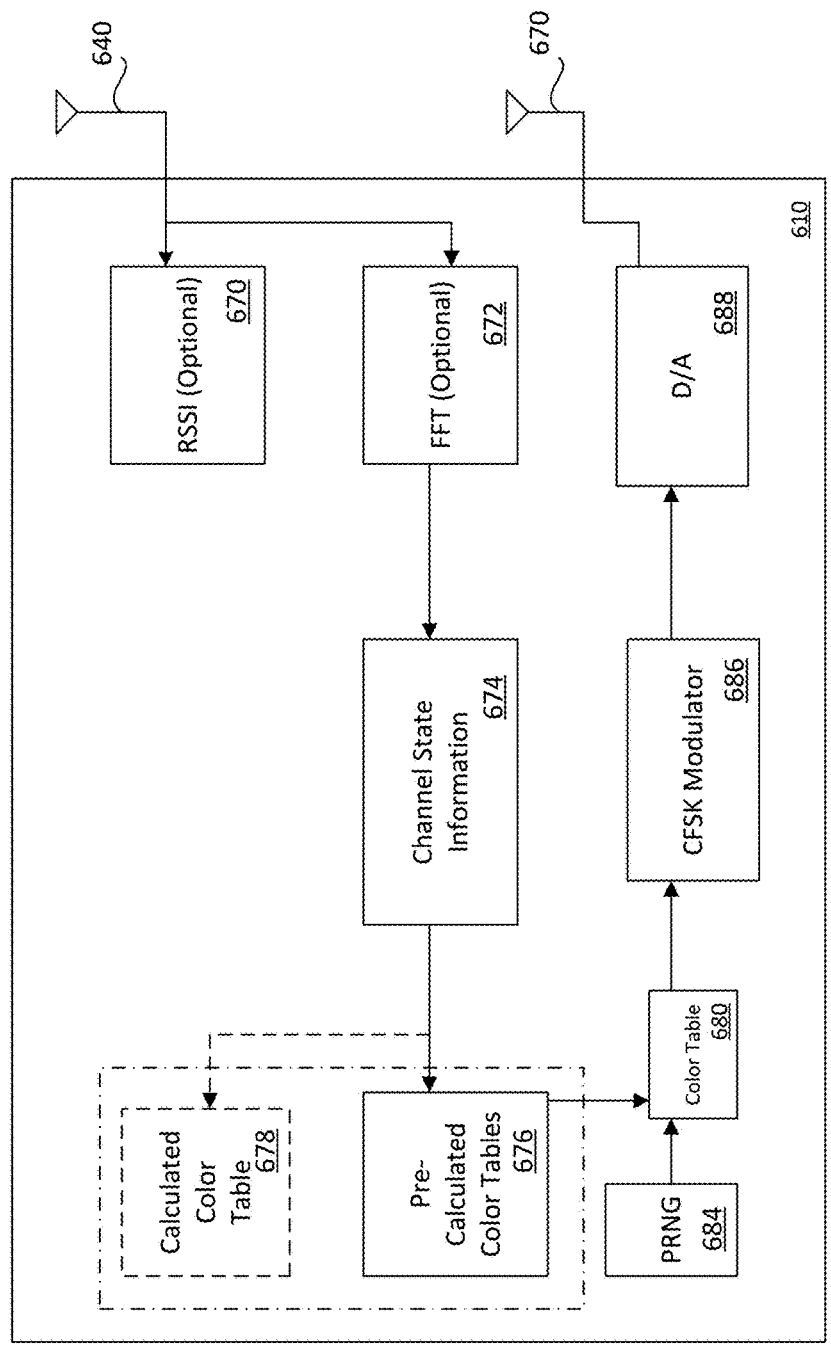
FIG. 7 provides a block diagrammatic representation of an exemplary implementation of the transceiver of FIG. 6.

FIG. 7 provides a block diagrammatic representation of an exemplary implementation of the transceiver 610 of FIG. 6. As shown, the transceiver 610 includes an optional received signal strength indicator (RSSI) module 670 and an optional Fast Fourier Transform (FFT) channelization module 672. A channel state information (CSI) module 674 may derive channel state information from the frequency domain information provided by the FFT module 672, from RSSI information provided by the RSSI module 670, or from other channel-related information. Without loss of generality, although not shown, such CSI derivation may also be performed using multiple antennas in lieu of the single antenna 640. Based upon the derived channel state information, the CSI module 674 selects a pre-calculated color table 676 or calculates a color table 678. The selected or calculated color table is then used as color table 680 in pre-mapping phases of the output of PRNG 684 in the manner described herein. The pre-mapped output of the PRNG 684 is the provided to a CFSK modulator 686. The resultant chaotic-FSK sequence produced by the CFSK modulator 686 is then converted to an analog signal by D/A converter 688 and transmitted via transmit antenna 670.

A method and system configured to provide a novel adaptation of an arbitrary phase spread spectrum waveform capable of supporting a variety of frequency selective spread modulations, incorporating optional amplitude shaping, and optionally enabling spreading bandwidth expansion and contraction, has been disclosed herein. Embodiments of each of the disclosed methods is exceedingly hardware efficient, making them practical additions to virtually any sequence-based spread spectrum communication system. Moreover, waveforms produced using the proposed modulation technique retain the constant envelope behavior of continuous phase modulated (CPM) signals, yet the proposed approach results in computationally efficient for receiver processing. That is, a receiver configured to effect CSFK demodulation may utilize despreader correlation processing similar to that used in processing a carrier shift keyed (CSK) or traditional sequence-based spread spectrum signal, as modified in accordance with the teachings herein to accommodate shaping of the frequency domain spectra of the transmitted spread spectrum signal.

In some configurations, the apparatus or system includes means for performing various functions as described herein. In one aspect, the aforementioned means may be a module including a processor or processors and associated memory in which embodiments of the invention reside, such as are shown in the preceding drawings and which are configured to perform the functions recited by the aforementioned means. This may be, for example, modules or apparatus residing in client devices, host server systems, and/or other network devices such as are shown and/or described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available non-transitory media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for generating a communications signal, the apparatus comprising:
    a pseudorandom number generator for providing a sequence of pseudorandom phase words;
    a mapping module coupled with an output of the pseudorandom number generator, the mapping module including a color mapping table containing phase value information, wherein the mapping module provides an output phase word sequence by phase mapping the sequence of pseudorandom phase words in accordance with the phase value information; and
    a modulator coupled with an output of the mapping module, the modulator including a phase mapper, followed by a spreader and a band-limiting filter, wherein the modulator is operative to generate the communications signal using the output phase word sequence, and wherein a frequency domain spectrum of the communications signal is determined in accordance with the phase value information.

2. The apparatus of claim 1 wherein the mapping module includes the color mapping table followed by an integrator, and wherein the color mapping table is coupled with an input of the mapping module, and the integrator is coupled with the output of the mapping module.

3. The apparatus of claim 1 wherein the mapping module includes an integrator followed by the color mapping table, and wherein the integrator is coupled with an input of the mapping module, and the color mapping table is coupled with the output of the mapping module.

4. The apparatus of claim 1 wherein the sequence of pseudorandom phase words includes a sequence of k-bit phase words uniformly distributed as values on $GF(2^k)$, and wherein the phase value information included in the color mapping table surjectively maps the sequence of k-bit phase words onto a subset of $GF(2^k)$.

5. The apparatus of claim 4 wherein the color mapping table includes $2^k$ memory entries and wherein each of the $2^k$ memory entries stores a uniform phase value.

6. The apparatus of claim 4 wherein the color mapping table includes $2^k$ memory entries and wherein the $2^k$ memory entries are subdivided into a discrete number of M allowable phases, thereby establishing a discrete number of phase steps.

7. The apparatus of claim 4 wherein the color mapping table includes $2^k$ memory entries and wherein the $2^k$ memory entries store non-uniform phase values.

8. The apparatus of claim 4 wherein the color mapping table includes $2^k$ memory entries and wherein the $2^k$ memory entries store a time-varying programmable set of phase values.

9. The apparatus of claim 4 wherein the color mapping table includes parallel, instantiated tables of phase words, and wherein the mapping module selects one of the parallel, instantiated tables of phase words in response to a table selection signal.

10. The apparatus of claim 9 wherein the table selection is based upon at least some portion of the k-bit phase words.

11. The apparatus of claim 1 wherein the sequence of pseudorandom phase words represent a sequence of phase difference values and wherein the phase value information corresponds to phase difference values, the mapping module further including an integrator configured to integrate a sequence of the phase difference values into a stream of phase values provided to the modulator wherein the stream of phase values affects a rate of change of phase of the communications signal.

12. The apparatus of claim 1 wherein the communications signal includes a chaotic signal.

13. A transmitter, comprising:
an encoder for generating encoded data symbols based upon input data provided by a data source;
a communications signal generator including:
a pseudorandom number generator for providing a sequence of pseudorandom phase words;
a mapping module coupled with an output of the pseudorandom number generator, the mapping module including a color mapping table containing phase value information, wherein the mapping module provides an output phase word sequence by phase mapping the sequence of pseudorandom phase words in accordance with the phase value information;
a modulator coupled with an output of the mapping module, the modulator including a phase mapper, followed by a spreader and a band-limiting filter, wherein the modulator generates a spreading sequence using the output phase word sequence, and wherein a frequency domain spectrum of the spreading sequence is determined in accordance with the phase value information; and
a transmit signal generator for generating a transmit signal by spreading the encoded data symbols using the spreading sequence.

14. The transmitter of claim 13 wherein the phase value information includes one of at least one phase value or at least one phase difference value.

15. A transceiver apparatus, comprising:
a receiver including a channel state information module coupled with an antenna via at least one of a Fast Fourier Transform module (FFT) or a received signal strength indicator (RSSI), wherein the channel state information module derives channel state information from a received signal;
a color mapping table storing phase value information wherein the phase value information is determined based at least in part upon the channel state information; and
a communications signal generator configured to generate a communications waveform, the communications signal generator including a mapping module operative to introduce a selected frequency domain spectra into the communications waveform in accordance with the phase value information.

16. The transceiver apparatus of claim 15 wherein the phase value information includes one of at least one phase value or at least one phase difference value.

17. A method for generating a communications signal, the method comprising:
providing a sequence of pseudorandom phase words;
generating a color mapping table containing phase value information;
providing an output phase word sequence by phase mapping the sequence of pseudorandom phase words in accordance with the phase value information; and
generating the communications signal using the output phase word sequence wherein a frequency domain spectrum of the communications signal is determined in accordance with the phase value information.

18. The method of claim 17 wherein the sequence of pseudorandom phase words includes a sequence of k-bit phase words uniformly distributed as values on $GF(2^k)$, the method further including surjectively mapping the sequence of k-bit phase words onto a subset of $GF(2^k)$.

19. The method of claim 18 wherein the color mapping table includes $2^k$ memory entries and wherein each of the $2^k$ memory entries stores a uniform phase value.

20. The method of claim 18 wherein the color mapping table includes $2^k$ memory entries and wherein the $2^k$ memory entries are subdivided into a discrete number of M allowable phases, thereby establishing a discrete number of phase steps.

21. The method of claim 18 wherein the color mapping table includes $2^k$ memory entries and wherein the $2^k$ memory entries store non-uniform phase values.

22. The method of claim 18 wherein the color mapping table includes $2^k$ memory entries and wherein the $2^k$ memory entries store a time-varying programmable set of phase values.

23. The method of claim 18 wherein the color mapping table includes parallel, instantiated tables of phase words, the method further including selecting one of the parallel, instantiated tables of phase words in response to a table selection signal.

24. The method of claim 23 wherein the table selection is based upon at least some portion of the k-bit phase words.

25. The method of claim 17 wherein the sequence of pseudorandom phase words represent a sequence of phase difference values and wherein the phase value information corresponds to phase difference values, the method further including synthesizing a stream of phase values by integrating ones of the phase difference values wherein the stream of phase values affects a rate of change of phase of the communications signal.

26. The method of claim 17 wherein the communications signal includes a chaotic signal.

27. A method, comprising:
generating encoded data symbols based upon input data provided by a data source; providing a sequence of pseudorandom phase words;
generating a color mapping table containing phase value information;
providing an output phase word sequence by phase mapping the sequence of pseudorandom phase words in accordance with the phase value information;
generating a spreading sequence using the output phase word sequence wherein a frequency domain spectrum of the spreading sequence is determined in accordance with the phase value information; and
generating a transmit signal by spreading the encoded data symbols using the spreading sequence.

28. The method of claim 27 wherein the phase value information includes one of at least one phase value or at least one phase difference value.

29. A method, comprising:
providing channel state information based upon a received signal, wherein the state information is derived from at least one of (a) frequency domain information provided by a Fast Fourier Transform (FFT) module or (b) received signal strength information provided by a received signal strength indicator (RSSI) module;

storing phase value information in a color mapping table, wherein the phase value information is determined based at least in part upon the channel state information; and generating, in accordance with the phase value information, a communications waveform having a selected frequency domain spectrum determined by the phase value information.

30. The method of claim 29 wherein the phase value information includes one of at least one phase value or at least one phase difference value.

\* \* \* \* \*